(12) United States Patent
Koganehira et al.

(10) Patent No.: US 11,505,710 B2
(45) Date of Patent: Nov. 22, 2022

(54) INK-JET INK COMPOSITION (71) Applicant: Seiko Epson Corporation, Tokyo (JP)

(72) Inventors: Shuichi Koganehira, Matsumoto (JP); Keigo Ando, Matsumoto (JP); Yoshitaka Miyajima, Matsumoto (JP)

(73) Assignee: SEIKO EPSON CORPORATION ( * ) Notice: Subject to any disclaimer, the term of this patent is extended or adjusted under 35 U.S.C. 154(b) by 342 days.

(21) Appl. No.: 16/906,094

(22) Filed: Jun. 19, 2020

(65) Prior Publication Data
US 2020/0399489 A1 Dec. 24, 2020

(30) Foreign Application Priority Data
Jun. 20, 2019 (JP) .............................. JP2019-114354

(51) Int. Cl.
C09D 11/033 (2014.01)
C09D 11/037 (2014.01)
C09D 11/102 (2014.01)
C09D 11/32 (2014.01)
C09D 11/30 (2014.01)

(52) U.S. Cl.
CPC ............ *C09D 11/32* (2013.01); *C09D 11/033* (2013.01); *C09D 11/037* (2013.01); *C09D 11/102* (2013.01); *C09D 11/30* (2013.01)

(58) Field of Classification Search
CPC ... C09D 11/033; C09D 11/037; C09D 11/102; C09D 11/30; C09D 11/32; C09D 11/322; C09D 11/38; C08K 5/1565
See application file for complete search history.

(56) References Cited

U.S. PATENT DOCUMENTS

| 8,137,448 | B2 * | 3/2012 | Koganehira | ......... | C09D 11/322 |
| | | | | | 106/31.89 |
| 8,697,774 | B2 * | 4/2014 | Tomura | .................. | C09D 11/40 |
| | | | | | 106/31.86 |
| 2008/0213548 | A1 * | 9/2008 | Koganehira | ......... | C09D 11/322 |
| | | | | | 427/256 |
| 2009/0308279 | A1 | 12/2009 | Koganehira et al. | | |

FOREIGN PATENT DOCUMENTS

JP      2015-078382 A      4/2015

* cited by examiner

Primary Examiner — Anh T Vo
(74) Attorney, Agent, or Firm — Harness, Dickey & Pierce, P.L.C.

(57) ABSTRACT

A ink-jet ink composition according to the present disclosure contains a colorant, water, a 1,2-alkanediol, and a water-soluble 1,3-dioxolane compound represented by the following formula:

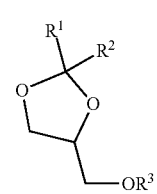

(1)

where $R^1$ and $R^2$ are independently selected from linear or branched alkyl groups containing one to four carbon atoms and $R^3$ is a hydrogen atom or at least one selected from the group consisting of an ethylene oxide adduct, a propylene oxide adduct, and a butylene oxide adduct and is terminated with a hydrogen atom.

11 Claims, 2 Drawing Sheets

INK-JET INK COMPOSITION

The present application is based on, and claims priority from JP Application Serial Number 2019-114354, filed Jun. 20, 2019, the disclosure of which is hereby incorporated by reference herein in its entirety.

BACKGROUND

1. Technical Field

The present disclosure relates to an ink-jet ink composition.

2. Related Art

An aqueous ink-jet ink composition is used in an ink jet recording method. In the ink jet recording method, in order to ensure both discharge stability and image quality, a 1,2-alkanediol such as 1,2-hexanediol is used as a penetrating solvent for recording media (see, for example, JP-A-2015-78382). In a technique described in JP-A-2015-78382, since 1,2-hexanediol is used as a penetrating solvent, the sticking of a face of an ink jet head is unlikely to occur, discharge properties are excellent, and a high-quality image can be obtained.

In printing using an aqueous ink-jet ink composition containing a 1,2-alkanediol, it is required to stably print a high-quality image at high speed.

SUMMARY

1. According to an aspect of the present disclosure, an ink-jet ink composition contains a colorant, water, a 1,2-alkanediol, and a water-soluble 1,3-dioxolane compound represented by the following formula:

(1)

where $R^1$ and $R^2$ are independently selected from linear or branched alkyl groups containing one to four carbon atoms and $R^3$ is a hydrogen atom or at least one selected from the group consisting of an ethylene oxide adduct, a propylene oxide adduct, and a butylene oxide adduct and is terminated with a hydrogen atom.

2. In the ink-jet ink composition specified in Item 1, the 1,2-alkanediol includes a 1,2-alkanediol containing seven or more carbon atoms.

3. In the ink-jet ink composition specified in Item 1 or 2, the water-soluble 1,3-dioxolane compound represented by Formula (1) is 2,2-dimethyl-1,3-dioxolane-4-methanol or 2-isobutyl-2-methyl-1,3-dioxolane-4-methanol.

4. The ink-jet ink composition specified in any one of Items 1 to 3 further contains at least one selected from a water-soluble polyoxyalkylene glyceryl ether and water-soluble polyoxyalkylene trimethylolpropane.

5. In the ink-jet ink composition specified in Item 4, the water-soluble polyoxyalkylene glyceryl ether and the water-soluble polyoxyalkylene trimethylolpropane are triols including at least one selected from the group consisting of an ethylene oxide adduct, a propylene oxide adduct, and a butylene oxide adduct.

6. In the ink-jet ink composition specified in Item 4 or 5, the water-soluble polyoxyalkylene glyceryl ether is one selected from the INCI name PPG-24-Glycereth-24 and the INCI name Glycereth-26 and the water-soluble polyoxyalkylene trimethylolpropane is the INCI name PPG-25-PEG-25 Trimethylolpropane.

7. In the ink-jet ink composition specified in any one of Items 4 to 6, at least one selected from the group consisting of the water-soluble polyoxyalkylene glyceryl ether, the water-soluble polyoxyalkylene trimethylolpropane, and the water-soluble 1,3-dioxolane compound represented by Formula (1) is derived from a biomass source.

8. In the ink-jet ink composition specified in any one of Items 4 to 7, the ratio of the mass percentage of at least one selected from the water-soluble polyoxyalkylene glyceryl ether and the water-soluble polyoxyalkylene trimethylolpropane to the mass percentage of the 1,2-alkanediol is 3:1 to 6:1.

9. In the ink-jet ink composition specified in any one of Items 1 to 8, the ratio of the mass percentage of the water-soluble 1,3-dioxolane compound represented by Formula (1) to the mass percentage of the 1,2-alkanediol is 3:1 to 6:1.

10. In the ink-jet ink composition specified in any one of Items 1 to 9, the 1,2-alkanediol is 1,2-octanediol.

11. The ink-jet ink composition specified in any one of Items 1 to 10 further contains a polysiloxane surfactant represented by the following formula as a surfactant:

(2)

where R represents a hydrogen atom or a methyl group, a represents an integer of 2 to 18, m represents an integer of 0 to 70, and n represents an integer of 1 to 8.

DESCRIPTION OF EXEMPLARY EMBODIMENTS

Some embodiments of the present disclosure are described below. The embodiments below illustrate examples of the present disclosure. The present disclosure is not in any way limited to the embodiments below and includes various modifications made without departing from the gist of the present disclosure. All of components described below are not necessarily components essential for the present disclosure.

1. Ink-Jet Ink Composition

An ink-jet ink composition according to an embodiment of the present disclosure contains a colorant, water, a 1,2- alkanediol, and a water-soluble 1,3-dioxolane compound represented by the following formula:

(1)

where $R^1$ and $R^2$ are independently selected from linear or branched alkyl groups containing one to four carbon atoms and $R^3$ is a hydrogen atom or at least one selected from the group consisting of an ethylene oxide adduct, a propylene oxide adduct, and a butylene oxide adduct and is terminated with a hydrogen atom.

The ink-jet ink composition (hereinafter also referred to as "ink composition" or "ink") is described below.

Herein, the ink-jet ink composition is an aqueous ink composition containing water. The term "aqueous ink composition" as used herein refers to an ink composition in which the content of water with respect to the mass of the ink composition is 30% by mass or more.

Components contained in the ink-jet ink composition and components which may be contained in the ink-jet ink composition are described below.

1.1. Colorant

The ink-jet ink composition contains the colorant.

Examples of the colorant include dyes and pigments. The colorant is preferably pigment from the viewpoint of color stability, lightfastness, and water resistance in the course of drying.

Examples of the pigment include inorganic pigments and organic pigments. These pigments may be used alone or in combination. Examples of the inorganic pigments include titanium oxide, iron oxide, and carbon black. The carbon black used may be one produced by a known method such as a contact method, a furnace method, or a thermal method. Examples of the organic pigments include azo pigments such as azo lakes, insoluble azo pigments, condensed azo pigments, and chelate azo pigments; polycyclic pigments such as phthalocyanine pigments, perylene pigments, perinone pigments, anthraquinone pigments, quinacridone pigments, dioxazine pigments, thioindigo pigments, isoindolinone pigments, and quinophthalone pigments; dye chelates such as basic dye chelates and acidic dye chelates; nitro pigments; nitroso pigments; and aniline black.

Particular examples of pigment are appropriately cited depending on the type of the ink composition, that is, the color thereof. Examples of pigment used when the ink composition is a yellow ink composition include C. I. Pigment Yellows 1, 2, 3, 12, 14, 16, 17, 73, 74, 75, 83, 93, 95, 97, 98, 109, 110, 114, 128, 129, 138, 139, 147, 150, 151, 154, 155, 180, and 185. Examples of pigment used when the ink composition is a magenta ink composition include C. I. Pigment Reds 5, 7, 12, 48 (Ca), 48 (Mn), 57 (Ca), 57:1, 112, 122, 123, 168, 184, 202, 209, and C. I. Pigment Violet 19. Examples of pigment used when the ink composition is a cyan ink composition include C. I. Pigment Blues 1, 2, 3, 15:2, 15:3, 15:4 15:34, 16, 22, and 60 and C. I. Vat Blues 4 and 60. Examples of pigment used when the ink composition is a black ink composition include carbons such as lamp black (C. I. Pigment Black 6), acetylene black, furnace black (C. I. Pigment Black 7), channel black (C. I. Pigment Black 7), and carbon black (C. I. Pigment Black 7); inorganic pigments such as an iron oxide pigment; and organic pigments such as aniline black (C. I. Pigment Black 1). A pearl pigment is not particularly limited. Examples of the pearl pigment include pigments such as titanium dioxide-coated mica, fish scale foil, and bismuth oxychloride, having a pearly luster or an interference luster. A metallic pigment is not particularly limited. Examples of the metallic pigment include particles of metals such as aluminium, silver, gold, platinum, nickel, chromium, tin, zinc, indium, titanium, and copper or alloys of the metals.

The content of the colorant in the ink composition is not particularly limited and is, for example, 1.0% by mass to 10.0% by mass. From the viewpoint of further effectively and reliably providing effects of the present disclosure, the content of the colorant in the ink composition is preferably 2.0% by mass to 8.0% by mass and more preferably 3.0% by mass to 7.0% by mass. Pigment has the property of being unlikely to be discolored by light, gas, or the like and is therefore preferably used. An image formed on a recording medium using pigment is excellent not only in quality but also in water resistance, gas resistance, and lightfastness and has good storage stability. This property is remarkable particularly in a case where an image is formed on a non-absorbent recording medium absorbing no ink or a low absorbent recording medium slightly absorbing ink.

When the colorant is pigment, the colorant can be used in the form of a pigment dispersion. In a method for dispersing the pigment, a dispersant imparting dispersibility to particles of the pigment can be used. The dispersant is preferably a dispersible resin. From the viewpoint of the dispersibility of the colorant, the dispersible resin is preferably, for example, a resin containing an oxyethyl skeleton (also referred to as the "oxyethyl skeleton-containing resin"), a resin containing a fluorene skeleton (also referred to as the "fluorene skeleton-containing resin"), a styrene-acrylic acid copolymer resin, or a urethanic resin and is more preferably the oxyethyl skeleton-containing resin, the urethanic resin, or the fluorene skeleton-containing resin. In particular, the dispersible resin is preferably the oxyethyl skeleton-containing resin or the fluorene skeleton-containing resin. These resins are adsorbed on the pigment to enhance the dispersibility thereof.

The oxyethyl skeleton-containing resin is, for example, a resin containing an oxyethyl acrylate skeleton and is preferably a compound represented by Formula (3) below. Oxyethyl skeleton-containing resins are used alone or in combination.

(3)

In Formula (3), $R^1$ and $R^3$ are independently a hydrogen atom or a methyl group, $R^2$ is an alkyl group or an aryl group, and n is an integer of 1 or more.

The compound represented by Formula (3) is, for example, a resin which contains 45% by mole to 55% by mole of ortho-hydroxyethylated phenylphenol acrylate, which is specified by CAS No. 72009-86-0; 20% by mole to 30% by mole of acrylic acid, which is specified by CAS No. 79-10-7; and 20% by mole to 30% by mole of methacrylic acid, which is specified by CAS No. 79-41-4, as monomers such that the sum of the contents of ortho-hydroxyethylated phenylphenol acrylate, acrylic acid, and methacrylic acid is 100% by mole. The monomer composition ratio may be such that the percentage of ortho-hydroxyethylated phenylphenol acrylate, which is specified by CAS No. 72009-86-0, is 70% by mass to 85% by mass; the percentage of acrylic acid, which is specified by CAS No. 79-10-7, is 5% by mass to 15% by mass; the percentage of methacrylic acid, which is specified by CAS No. 79-41-4, is 10% by mass to 20% by mass; and the sum of the percentages of ortho-hydroxyethylated phenylphenol acrylate, acrylic acid, and methacrylic acid may be 100% by mass.

Preferred examples of the compound represented by Formula (3) include nonylphenoxypolyethylene glycol acrylate and polypropyleneglycol #700 acrylate.

From the viewpoint of further effectively and reliably providing effects of the present disclosure, the content of the oxyethyl skeleton-containing resin in the ink composition is preferably 0.1% by mass to 5.0% by mass, more preferably 0.3% by mass to 3.0% by mass, and further more preferably 0.5% by mass to 1.5% by mass. From the same viewpoint, the amount of the oxyethyl skeleton-containing resin contained therein is preferably five parts by mass to 50 parts by mass per 100 parts by mass of the colorant, more preferably ten parts by mass to 40 parts by mass, and further more preferably 15 parts by mass to 25 parts by mass.

The fluorene skeleton-containing resin can be obtained by copolymerizing, for example, monomers below.

5-Isocyanate-1-(isocyanatomethyl)-1,3,3-trimethylcyclohexane (CAS No. 4098-71-9)

2,2'-[9H-fluorene-9-ylidenebis(4,1-phenyleneoxy)]bisethanol (CAS No. 117344-32-8)

3-Hydroxy-2-(hydroxymethyl)-2-methylpropionic acid (CAS No. 4767-03-7)

N,N-Diethylethanediamine (CAS No. 100-36-7)

Fluorene skeleton-containing resins are used alone or in combination.

The monomer composition ratio of the fluorene skeleton-containing resin is preferably such that the percentage of 5-isocyanate-1-(isocyanatomethyl)-1,3,3-trimethylcyclohexane (CAS No. 4098-71-9) is 35% by mass to 45% by mass, the percentage of 2,2'-[9H-fluorene-9-ylidenebis(4,1-phenyleneoxy)]bisethanol (CAS No. 117344-32-8) is 40% by mass to 60% by mass, the percentage of 3-hydroxy-2-(hydroxymethyl)-2-methylpropionic acid (CAS No. 4767-03-7) is more than 0% by mass to 15% by mass, the percentage of N,N-diethylethanediamine (CAS No. 100-36-7) is more than 0% by mass to 15% by mass, and the sum of the percentages of 5-isocyanate-1-(isocyanatomethyl)-1,3,3-trimethylcyclohexane, 2,2'-[9H-fluorene-9-ylidenebis(4,1-phenyleneoxy)]bisethanol, 3-hydroxy-2-(hydroxymethyl)-2-methylpropionic acid, and N,N-diethylethanediamine is 100% by mass.

From the viewpoint of further ensuring both the initial viscosity and storage stability of the ink composition, the number-average molecular weight (Mn) of the uncrosslinked fluorene skeleton-containing resin is preferably 2,000 to 5,000 and more preferably 3,000 to 4,000. The number-average molecular weight (Mn) is measured by, for example, gel permeation chromatography (GPC).

From the viewpoint of further effectively and reliably providing effects of the present disclosure, the content of the fluorene skeleton-containing resin in the ink composition is preferably 0.1% by mass to 5.0% by mass, more preferably 0.3% by mass to 3.0% by mass, and further more preferably 0.5% by mass to 1.5% by mass. From the same viewpoint, the amount of the fluorene skeleton-containing resin contained therein is preferably five parts by mass to 50 parts by mass per 100 parts by mass of the colorant, more preferably ten parts by mass to 40 parts by mass, and further more preferably 15 parts by mass to 25 parts by mass.

1.2. Water

The ink-jet ink composition contains water. Water is a main medium for an aqueous ink-jet ink composition and is a component evaporated and scattered by drying. Water is preferably one obtained by removing ionic impurities a minimum like pure water such as ion-exchanged water, ultrafiltered water, reverse osmosis-purified water, or distilled water or ultrapure water. Using water sterilized by ultraviolet irradiation or the addition of hydrogen peroxide enables the growth of mold and bacteria to be suppressed during long-term storage and is therefore preferable.

The content of water in the ink-jet ink composition is preferably 30% by mass or more, more preferably 40% by mass or more, further more preferably 50% by mass or more, and particularly preferably 60% by mass or more.

1.3. 1,2-Alkanediol

The ink-jet ink composition contains the 1,2-alkanediol. The 1,2-alkanediol is a type of polar organic solvent, has the excellent effect of increasing the wettability of the ink composition particularly to a low absorbent or non-absorbent recording medium to uniformly wet the low absorbent or non-absorbent recording medium and also has an excellent function as a humectant for recording media.

The 1,2-alkanediol may be branched or linear. Examples of the 1,2-alkanediol include 1,2-pentanediol, 1,2-hexanediol, 1,2-heptanediol, 1,2-octanediol, 4,4-dimethyl-1,2-pentanediol, 5-methyl-1,2-hexanediol, 4-methyl-1,2-pentanediol, 4-methyl-1,2-hexanediol, and 3,3-dimethyl-1,2-butanediol. These may be used alone or in combination.

The 1,2-alkanediol is preferably a 1,2-alkanediol containing five or more carbon atoms and more preferably a 1,2-alkanediol containing seven or more carbon atoms. The 1,2-alkanediol preferably contains five to nine carbon atoms and may be linear or branched. In particular, the 1,2-alkanediol is preferably a water-insoluble 1,2-alkanediol containing seven or more carbon atoms. The term "water-insoluble" means that the solubility in water, that is, the amount of a solute in 100 g of water is less than 1.0 g.

The 1,2-alkanediol containing seven or more carbon atoms is a high-viscosity liquid or solid because of a feature that the number of carbon atoms is seven or more. This allows droplets of the ink composition applied to a recording medium to be unlikely to flow, enables the occurrence of aggregation spots or line unevenness to be reduced, and enables the fixability to the recording medium to be enhanced. Therefore, when the ink composition contains the 1,2-alkanediol containing seven or more carbon atoms, a higher-quality image can be obtained.

The content of the 1,2-alkanediol in the ink composition is preferably 1.0% by mass to 20.0% by mass, more preferably 3.0% by mass to 15.0% by mass, and further more preferably 6.0% by mass to 10.0% by mass. This enables the function of ink to be enhanced.

1.4. Specific 1,3-Dioxolane Compound

The ink-jet ink composition contains a specific 1,3-dioxolane compound, that is, the water-soluble 1,3-dioxolane compound represented by the following formula:

(1)

where $R^1$ and $R^2$ are independently selected from linear or branched alkyl groups containing one to four carbon atoms and $R^3$ is a hydrogen atom or at least one selected from the group consisting of an ethylene oxide adduct, a propylene oxide adduct, and a butylene oxide adduct and is terminated with a hydrogen atom.

Since the ink-jet ink composition contains the 1,2-alkanediol, cockling occurs to cause head scratching in some cases. In a case where head scratching occurs, the distance between a head and a recording medium needs to be increased, the landing accuracy of ink droplets deteriorates due to the internal wind pressure, and a high-quality image is unlikely to be capable of being obtained. Therefore, the ink-jet ink composition contains Solketal, which is a water-soluble alcohol having a high surface tension of 50 mN/m or more and a high vapor pressure of 0.2 mmHg or more and therefore having high drying properties, so that the surface drying of a print can be facilitated, cockling can be prevented, and a high-quality image can be obtained.

In order to obtain a high-quality image, it is necessary that the mass of droplets of ink is smaller such that the diameter of dots on a recording medium after landing is small. However, since transporting the recording medium at high speed generates a wind pressure, the accuracy of the landing position of, particularly, an ink droplet with a mass of less than 3 ng deteriorates extremely and it is difficult to obtain a high-quality image. Thus, as the diameter of dots formed by landing ink droplets with a mass of 3 ng or more on a recording medium is smaller, a higher-quality image can be obtained. In the ink jet composition, ink contains the specific 1,3-dioxolane compound, so that the ink has an increased surface tension and vapor pressure and is likely to be dried. Therefore, a coffee-stain phenomenon occurs clearly at the edges of dots on a recording medium; hence, the wet spreading of the ink is suppressed and the diameter of the dots is small. Even though the ink contains the water-insoluble 1,2-alkanediol, enhancing drying properties using the specific 1,3-dioxolane compound allows the dot diameter to be small and a high-quality image to be obtained as described above.

The specific 1,3-dioxolane compound is preferably 2,2-dimethyl-1,3-dioxolane-4-methanol or 2-isobutyl-2-methyl-1,3-dioxolane-4-methanol. In this case, a particularly high-quality image is obtained.

The content of the specific 1,3-dioxolane compound in the ink is not particularly limited and the specific 1,3-dioxolane compound is preferably contained such that the ratio of the mass percentage of the specific 1,3-dioxolane compound to the mass percentage of the 1,2-alkanediol is 3:1 to 6:1. For example, the content of the specific 1,3-dioxolane compound in the ink composition is preferably 1.0% by mass to 60.0% by mass, more preferably 3.0% by mass to 40.0% by mass, and further more preferably 6.0% by mass to 20.0% by mass. This allows a higher-quality image to be obtained.

In this embodiment, the specific 1,3-dioxolane compound is preferably derived from a biomass source. When the specific 1,3-dioxolane compound is one derived from the biomass source, the specific 1,3-dioxolane compound can be mass-produced at low cost and the cost of the ink composition can be reduced.

1.5. Specific Compound

The ink-jet ink composition preferably contains a specific compound, that is, at least one selected from a water-soluble polyoxyalkylene glyceryl ether and water-soluble polyoxyalkylene trimethylolpropane. In this case, moisture retention properties of ink are high and it can be reduced that, after an ink jet head is sealed with a head cap, moisture is rapidly absorbed from an ink interface in a nozzle of the ink jet head into liquid waste on the head cap side. Thus, discharge properties of the ink jet head after leaving the head cap can be ensured; hence, the amount of the ink used for maintenance immediately before recording is reduced and a higher-quality image is obtained. Furthermore, the solubility of the water-insoluble 1,2-alkanediol is ensured and a higher-quality image is obtained.

The specific compound is preferably a triol including at least one selected from the group consisting of an ethylene oxide adduct, a propylene oxide adduct, and a butylene oxide adduct. In this case, the function of retaining moisture is high. Since those other than the ethylene oxide adduct have enhanced hydrophobicity, the number of units of the ethylene oxide adduct is preferably greater than or equal to the total number of units of the propylene oxide adduct and the butylene oxide adduct from the viewpoint of water solubility. Incidentally, for uniform dissolution, the ink composition may contain less than 6.0% by mass of 1,6-hexanediol or 2,2'-dimethyl-1,3-propanediol, which is solid at 20° C. and exhibits moisture retention properties. This is not limited to a case where the number of units of the ethylene oxide adduct is less than the total number of units of the propylene oxide adduct and the butylene oxide adduct.

Examples of the specific compound include polyoxyethylene trimethylolpropane, polyoxypropylene trimethylolpropane, polyoxybutylene trimethylolpropane, polyoxypropylene glyceryl ether represented by Formula (4) below (the sum a+b+c that is the number of moles of added propylene oxide represents an integer of 1 to 9), polyoxyethylene polyoxypropylene glyceryl ether represented by Formula (5) below (the moiety in brackets is a random addition, the sum a+b+c that is the number of moles of added ethylene oxide represents 24, and the sum x+y+z that is the number of moles of added propylene oxide represents 24), polyoxybutylene polyoxyethylene polyoxypropylene glyceryl ether represented by Formula (6) below (the moiety in brackets is a random addition, the sum a+b+c that is the number of moles of added ethylene oxide represents 8, the sum h+i+j that is the number of moles of added propylene oxide represents 5, and the sum x+y+z that is the number of moles of added butylene oxide represents 3), polyoxyethylene polyoxypropylene trimethylolpropane represented by Formula (7) below (the moiety in brackets is a random addition, the sum a+b+c that is the number of moles of added ethylene oxide represents an integer of 10 to 25, and the sum x+y+z that is the number of moles of added propylene oxide represents an integer of 25 to 68), polyoxypropylene glyceryl ether represented by Formula (8) below (the sum a+b+c+d that is the number of moles of added propylene oxide represents an integer of 9 to 14), and polyoxyethylene polyoxypropylene pentaerythritol ether represented by Formula (9) below (the sum a+b+c that is the number of moles of added ethylene oxide represents 5 and the sum w+x+y+z that is the number of moles of added propylene oxide represents 65).

(4)
(5)
(6)
(7)
(8)
(9)

As the specific compound, the water-soluble polyoxyalkylene glyceryl ether is preferably one selected from the INCI name PPG-24-Glycereth-24 and the INCI name Glycereth-26. The water-soluble polyoxyalkylene trimethylolpropane is preferably the INCI name PPG-25-PEG-25 Trimethylolpropane.

Examples of the specific compound include UNIOL® SGP-65, UNIOL® TG-700, UNIOL® TG-1000, UNIOL® TG-3000, UNIOL® TG-4000R, WILBRIDE® S-753, WILBRIDE® S-753D, UNILUBE® 50TG-32, UNILUBE® 43TT-2500, UNILUBE® 1017-4500, UNILUBE® DGP-700, UNILUBE® DGP-700F, UNILUBE® DGP-950, and UNILUBE® 5TP-300 KB available from NOF Corporation.

The content of the specific compound in ink is not particularly limited and the specific compound is preferably contained such that the ratio of the mass percentage of the specific compound to the mass percentage of the 1,2-alkanediol is 3:1 to 6:1. For example, the content of the specific compound in the ink composition is preferably 1.0% by mass to 60.0% by mass, more preferably 3.0% by mass to 40.0% by mass, and further more preferably 6.0% by mass to 20.0% by mass. This allows a higher-quality image to be obtained.

In this embodiment, the specific compound is preferably derived from a biomass source. When the specific compound is one derived from the biomass source, the specific compound can be mass-produced at low cost and the cost of the ink composition can be reduced.

1.6. Specific Surfactant

The ink-jet ink composition preferably contains a specific surfactant, that is, a polysiloxane surfactant represented by the following formula as a surfactant:

(2)

where R represents a hydrogen atom or a methyl group, a represents an integer of 2 to 18, m represents an integer of 0 to 70, and n represents an integer of 1 to 8.

The specific surfactant tends to be capable of further suppressing the uneven aggregation and bleeding of ink during printing. The specific surfactant is, for example, a surfactant described in Japanese Patent No. 5359018. In detail, the specific surfactant preferably includes Surfactant (a) which is represented by Formula (2) and which satisfies Condition (a) below and/or Surfactant (b) which is represented by Formula (2) and which satisfies Condition (b) below. This tends to enable the uneven aggregation of ink to be further suppressed even when the ink composition is applied to printing paper serving as a recording medium.

Condition (a): In Formula (2), a is an integer of 2 to 13, m is an integer of 2 to 50, and n is an integer of 1 to 8 (preferably 1 to 5).

Condition (b): In Formula (2), R is a methyl group, a is an integer of 6 to 18, m is 0, and n is 1.

The specific surfactant preferably includes one selected from the group consisting of Surfactant (c) which is represented by Formula (2) and which satisfies Condition (c) below, Surfactant (d) which is represented by Formula (2) and which satisfies Condition (d) below, and Surfactant (e) which is represented by Formula (2) and which satisfies Condition (e) below. This tends to enable the uneven aggregation of ink to be further suppressed during printing.

Condition (c): In Formula (2), a is an integer of 2 to 5, m is an integer of 20 to 40, and n is an integer of 2 to 4.

Condition (d): In Formula (2), a is an integer of 9 to 13, m is an integer of 2 to 4, and n is an integer of 1 or 2.

Condition (e): In Formula (2), a is an integer of 6 to 10, m is an integer of 10 to 20, and n is an integer of 4 to 8.

The specific surfactant preferably includes one or more selected from the group consisting of Surfactant (f) which is represented by Formula (2) and which satisfies Condition (f) below and Surfactant (g) which is represented by Formula (2) and which satisfies Condition (g) below. This tends to enable the uneven aggregation and bleeding of ink to be further suppressed during printing.

Condition (f): In Formula (2), a is an integer of 2 to 5, m is an integer of 20 to 40, and n is an integer of 2 to 4.

Condition (g): In Formula (2), a is an integer of 7 to 11, m is an integer of 30 to 50, and n is an integer of 3 to 5.

The specific surfactant preferably includes one or more selected from the group consisting of Surfactant (h) which is represented by Formula (2) and which satisfies Condition (h) below and Surfactant (i) which is represented by Formula (2) and which satisfies Condition (i) below. This tends to enable the uneven aggregation and bleeding of ink to be further suppressed during printing.

Condition (h): In Formula (2), R is a methyl group, a is an integer of 9 to 13, m is an integer of 2 to 4, and n is an integer of 1 or 2.

Condition (i): In Formula (2), a is an integer of 6 to 10, m is an integer of 10 to 20, and n is an integer of 4 to 8.

The specific surfactant preferably includes Surfactant (j) which is represented by Formula (2) and which satisfies Condition (j) below. This tends to enable the uneven aggregation and bleeding of ink to be further suppressed during printing.

Condition (j): In Formula (2), R is a methyl group, a is an integer of 6 to 12, m is 0, and n is 1.

The specific surfactant preferably includes one or more selected from the group consisting of Surfactant (k) which is represented by Formula (2) and which satisfies Condition (k) below, Surfactant (l) which is represented by Formula (2) and which satisfies Condition (l) below, and Surfactant (m) which is represented by Formula (2) and which satisfies Condition (m) below. This tends to enable the uneven aggregation and bleeding of ink to be further suppressed during printing.

Condition (k): In Formula (2), R is a hydrogen atom, a is an integer of 7 to 11, m is an integer of 30 to 50, and n is an integer of 3 to 5.

Condition (l): In Formula (2), R is a methyl group, a is an integer of 9 to 13, m is an integer of 2 to 4, and n is an integer of 1 or 2.

Condition (m): In Formula (2), R is a methyl group, a is an integer of 6 to 10, m is an integer of 10 to 20, and n is an integer of 4 to 8.

The specific surfactant preferably includes one or more selected from the group consisting of Surfactant (n) which is represented by Formula (2) and which satisfies Condition (n) below, Surfactant (o) which is represented by Formula (2) and which satisfies Condition (o) below, and Surfactant (p) which is represented by Formula (2) and which satisfies Condition (p) below. This tends to enable the uneven aggregation and bleeding of ink to be further suppressed during printing.

Condition (n): In Formula (2), R is a hydrogen atom, a is an integer of 7 to 11, m is an integer of 30 to 50, and n is an integer of 3 to 5.

Condition (o): In Formula (2), R is a methyl group, a is an integer of 9 to 13, m is an integer of 2 to 4, and n is an integer of 1 or 2.

Condition (p): In Formula (2), R is a methyl group, a is an integer of 6 to 10, m is an integer of 10 to 20, and n is an integer of 4 to 8.

The specific compound may be prepared by a known method or may be a commercially available product. Examples of the commercially available product include, but are not limited to, products, such as BYK-306, BYK-307, BYK-333, BYK-341, BYK-345, BYK-346, BYK-347, BYK-348, and BYK-349, available from BYK Chemie Japan K.K.; products, such as KF-351A, KF-352A, KF-353, KF-354L, KF-355A, KF-615A, KF-945, KF-640, KF-642, KF-643, KF-6020, X-22-4515, KF-6011, and KF-6012, available from Shin-Etsu Chemical Co., Ltd.; and products, such as Silface SAG002, Silface SAG005, Silface SAG503A, and Silface SAG008, available from Nissin Chemical Industry Co., Ltd.

From the viewpoint of further enhancing the function of ink, the content of the specific surfactant in the ink-jet ink composition is preferably more than 0% by mass to 1.0% by mass, more preferably 0.05% by mass to 0.80% by mass, and further more preferably 0.10% by mass to 0.50% by mass.

The ink-jet ink composition may contain other surfactants, that is, for example, an acetylene glycol surfactant, a fluorinated surfactant, a gemini surfactant, an anionic surfactant, a nonionic surfactant, and an amphoteric surfactant unless effects of the present disclosure are inhibited. The ink-jet ink composition need not contain the other surfactants.

1.7. Another Compound

The ink-jet ink composition preferably contains another compound, that is, for example, a water-soluble organic solvent other than the above in addition to the above-mentioned compounds. When the ink composition contains the water-soluble organic solvent, the ink composition is excellent in discharge stability during recording, image quality, and abrasion resistance. Furthermore, when ink composition contains the water-soluble organic solvent, drying properties of the ink composition discharged onto a recording medium are better and an image with excellent quality and abrasion resistance can be obtained. The water-soluble organic solvent is preferably contained in the dispersant together with pigment.

Examples of the water-soluble organic solvent include higher aliphatic alcohols containing seven or more carbon atoms, glycol ethers, and alkanediols other than the 1,2-alkanediol.

The higher aliphatic alcohols containing seven or more carbon atoms are preferably, for example, 2,6-dimethyl-4-heptanol, 2,6-dimethyl-2-heptanol, 2,4-dimethyl-3-pentanol, and 2,3,4-trimethyl-3-pentanol.

The glycol ethers are preferably, for example, diethylene glycol mono-n-butyl ether, triethylene glycol monoethyl ether, triethylene glycol mono-n-butyl ether, and tripropylene glycol monomethyl ether from the viewpoint of a reduction in surface tension.

The alkanediols are preferably 3-methyl-1,5-pentanediol and 4-methyl-1,2-pentanediol from the viewpoint of a reduction in surface tension and are preferably 2,5-dimethyl-2,5-hexanediol from the viewpoint of preventing bleeding between different colors.

From the viewpoint of further effectively and reliably providing effects of the present disclosure, the content of the water-soluble organic solvent in the ink composition is preferably 1.0% by mass to 15.0% by mass in total with respect to the ink composition, more preferably 2.0% by mass to 10.0% by mass, and further more preferably 3.0% by mass to 8.0% by mass. When the content of the water-soluble organic solvent is within the above range, the discharge stability of the ink composition, image quality, and abrasion resistance are more excellent.

The normal boiling point of the water-soluble organic solvent is preferably 180° C. or higher, more preferably 200° C. or higher, and further more preferably 210° C. or higher. The normal boiling point of the water-soluble organic solvent is preferably 300° C. or lower, more preferably 280° C. or lower, further more preferably 270° C. or lower, and particularly preferably 250° C. or lower. When the normal boiling point of the water-soluble organic solvent is within the above range, the discharge stability of the ink composition, image quality, and abrasion resistance are more excellent.

1.8. Other Components

The following additives may be appropriately added to the ink-jet ink composition for the purpose of maintaining the storage stability thereof and the discharge stability of an ink jet head well, for the purpose of improving clogging, or for the purpose of preventing the deterioration of ink: various additives such as a dissolution aid, a viscosity modifier, a pH adjustor, an oxidation inhibitor, a preservative, a fungicide, a corrosion inhibitor, a humectant that is not any organic solvent, and a chelating agent for capturing metal ions having an influence on dispersion.

1.9. Method for Preparing Ink-Jet Ink Composition

In this embodiment, the ink-jet ink composition is obtained in such a manner that the above-mentioned components are mixed together in an arbitrary order and impurities are removed by filtration or the like as required. As a method for mixing the components, a method in which the components are sequentially added to a container equipped with a stirring device such as a mechanical stirrer or a magnetic stirrer and are mixed together by stirring is preferably used. As a filtration method, centrifugal filtration, filter filtration, or the like may be performed as required.

1.10. Physical Properties of Ink-Jet Ink Composition

In this embodiment, the ink composition preferably has a surface tension (static surface tension) of 18 mN/m to 40 mN/m at 20° C., more preferably 20 mN/m to 35 mN/m, and further more preferably 22 mN/m to 33 mN/m from the viewpoint of the balance between the quality of an image and the reliability of ink for ink jet recording. Incidentally, the surface tension can be measured in such a manner that a platinum plate is wetted with ink in a 20° C. environment and the surface tension of the ink is determined using, for example, an automatic surface tensiometer, CBVP-Z, available from Kyowa Interface Science Co., Ltd.

In this example, the ink composition preferably has a viscosity of 3 mPa•s to 10 mPa•s at 20° C. and more preferably 3 mPa•s to 8 mPa•s from the viewpoint of the balance between image quality and the reliability of ink for ink jet recording. Incidentally, the viscosity can be measured in a 20° C. environment using, for example, a rheometer, MCR-300, available from Physica.

1.11. Ink Jet Recording Apparatus and Recording Method

Figure 1:
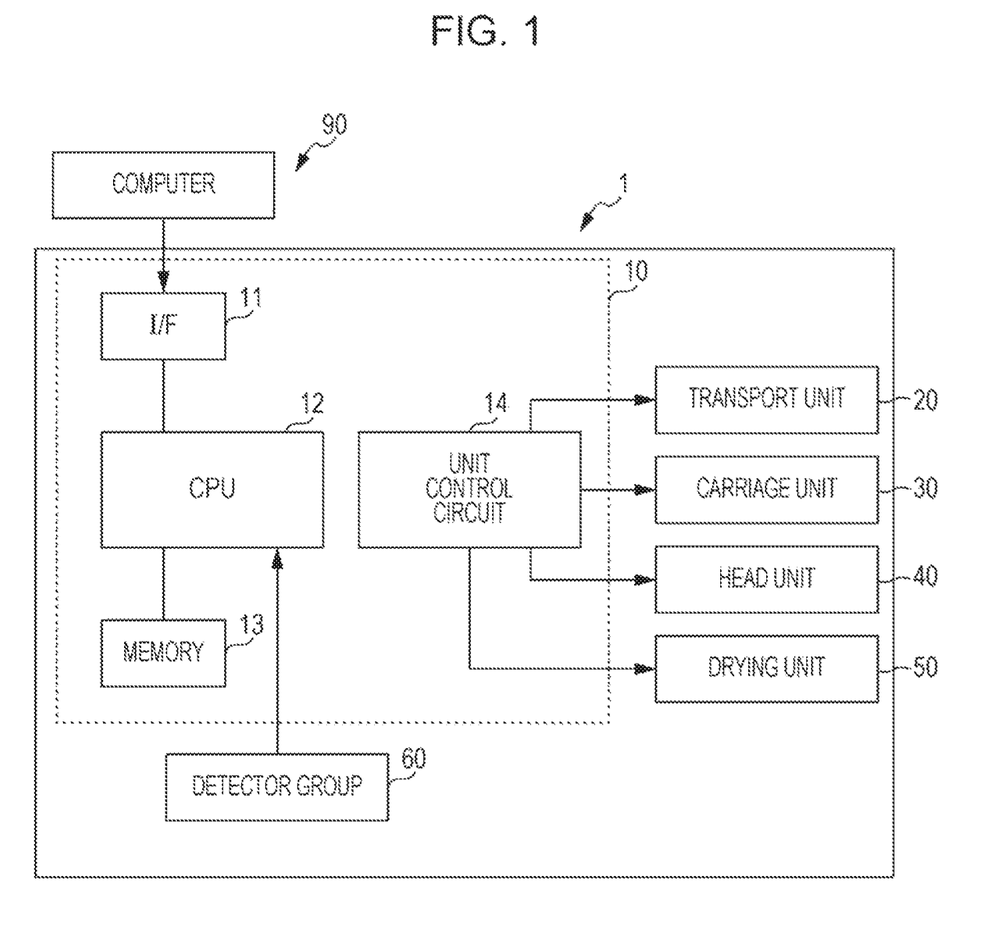
FIG. 1 is a block diagram of a recording system including an ink jet recording apparatus usable in an embodiment.
Figure 2:
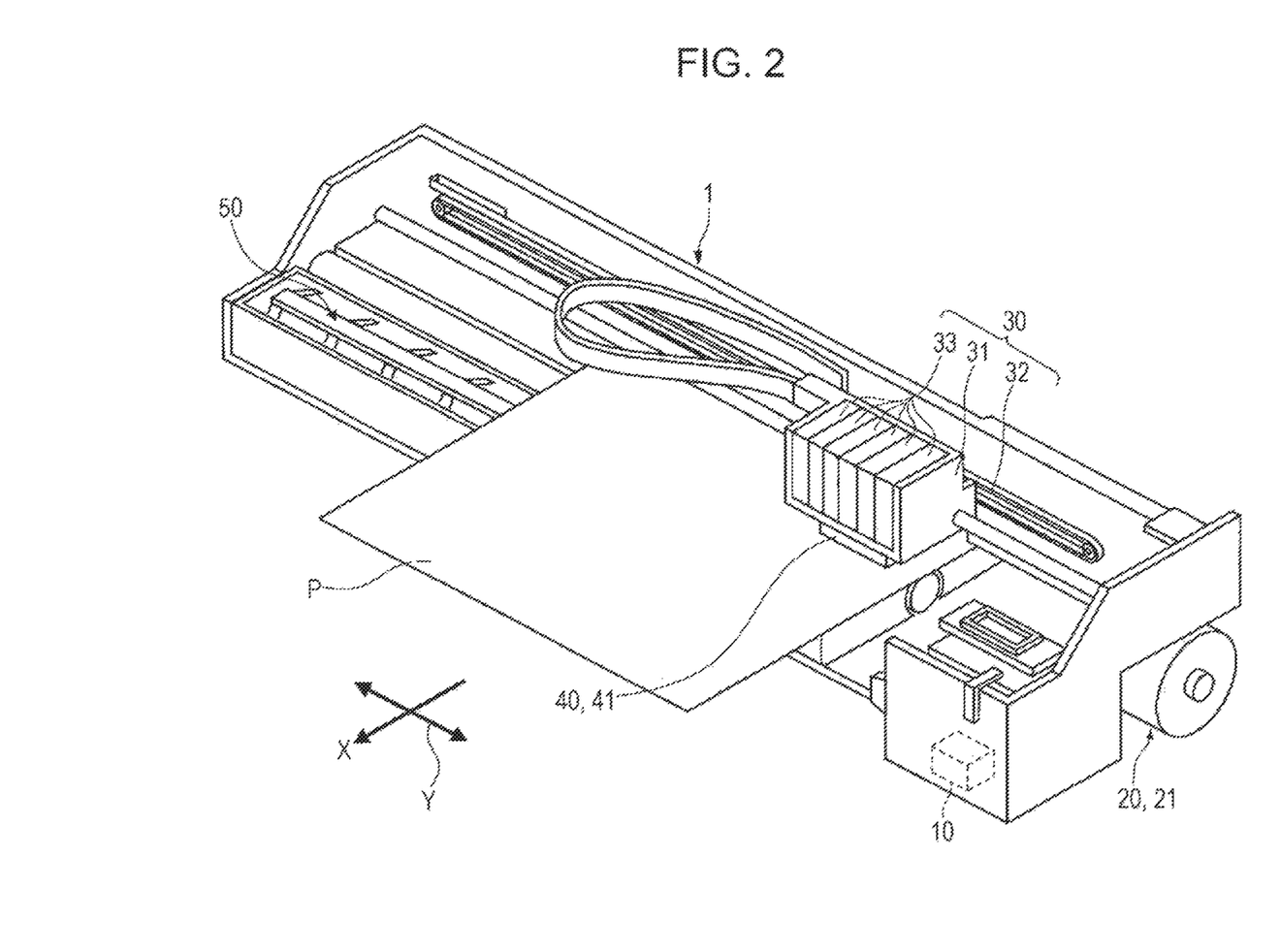
FIG. 2 is a schematic perspective view showing the configuration of the ink jet recording apparatus shown in FIG. 1.

Next, an ink jet recording apparatus 1 capable of using the ink-jet ink composition is described with reference to FIGS. 1 and 2. FIG. 1 is a block diagram of a recording system including the ink jet recording apparatus 1 and a computer 90 connected thereto. FIG. 2 is a schematic perspective view showing the configuration of the ink jet recording apparatus 1.

The ink jet recording apparatus 1 includes a controller 10, a transport unit 20, a carriage unit 30, a head unit 40, a drying unit 50, and a detector group 60. The ink jet recording apparatus 1 further includes an ink jet head 41 (see FIG. 2) including nozzle arrays each composed of a plurality of nozzle holes and makes a record on a recording medium P by an ink jet process.

The controller 10 includes an interface section 11, a CPU 12, a memory 13, and a unit control circuit 14. The interface section 11 (I/F) transmits and receives data between the computer 90 and the ink jet recording apparatus 1. The CPU 12 is a processing unit for controlling the whole ink jet recording apparatus 1. The memory 13 reserves a region storing a program for the CPU 12, a work space, and the like. The CPU 12 controls each unit using the unit control circuit 14. The controller 10 is a control unit for controlling the ink jet recording apparatus 1 and controls each unit on the basis of detection results from the detector group 60.

The transport unit 20 includes a transport roller 21. The transport roller 21 is rotated by a motor, which is not shown, and transports the recording medium P from the upstream side to the downstream side in a direction in which the recording medium P continues, that is, a transport direction denoted by X in FIG. 2.

The carriage unit 30 includes a carriage 31 carrying the ink jet head 41, a carriage transfer mechanism 32 for reciprocating the carriage 31, and ink cartridges 33. The carriage unit 30 reciprocates the head unit 40 in width directions of the recording medium P that are denoted by Y in FIG. 2.

The ink cartridges 33 is filled with ink compositions. The ink cartridges 33 are not limited to those fitted to the carriage 31 and may be those which are fitted to, for example, the housing side of the ink jet recording apparatus 1 to supply the ink jet compositions to the ink jet head 41 through liquid supply tubes (not shown).

The head unit 40 has the ink jet head 41 attached to the carriage 31. The lower surface of the ink jet head 41 is provided with nozzle holes for discharging the ink compositions.

The drying unit 50 dries the ink compositions applied to the recording medium P. The drying unit 50 used is, for example, a platen heater having a heating function, a hot air heater, an IR heater, or the like. The drying unit 50 may be an air blower having no heating function or the like.

The ink jet head 41 includes the nozzle arrays, which are not shown. Each nozzle array is formed by arranging a plurality of nozzle holes. Each nozzle array is composed of, for example, a plurality of nozzle holes arranged in a transport direction of the recording medium P.

The ink jet recording apparatus 1 is a so-called serial-type ink jet recording apparatus. The term "serial-type ink jet recording apparatus" refers to one in which an ink jet head is mounted on a carriage moving in predetermined directions and droplets are discharged onto a recording medium while the ink jet head is moving in association with the movement of the carriage.

In this embodiment, the serial-type ink jet recording apparatus has been exemplified as the ink jet recording apparatus 1. The ink jet recording apparatus 1 is not limited to the serial-type ink jet recording apparatus and may be, for example, a line-type ink jet recording apparatus. The line-type ink jet recording apparatus includes an ink jet head wider than the width of a recording medium such that droplets are discharged onto a recording medium without moving the ink jet head.

In this embodiment, a recording method in which the ink jet recording apparatus 1 is used is performed by alternately repeating the operation of moving the carriage 31 in a movement direction shown in FIG. 2 and the operation of transporting the recording medium P. In this process, when each path is performed, the controller 10 controls the carriage unit 30 to move the carriage 31 in the movement direction and also controls the head unit 40 to discharge droplets of the ink compositions from predetermined nozzle holes of the ink jet head 41 such that the ink composition droplets are applied to the recording medium P. Furthermore, in a transport operation, the controller 10 controls the transport unit 20 to transport the recording medium P at a predetermined transport rate in the transport direction.

Repeating the path and the transport operation allows a region provided with a plurality of droplets (dots) to be gradually transported toward the drying unit 50. The droplets applied to the recording medium P are dried at a position facing the drying unit 50, whereby an image is completed. Thereafter, a completed recording article may be wound into a roll using a winding mechanism, which is not shown, or may be transported with a flat-bed mechanism, which is not shown.

The recording medium P is not particularly limited and is preferably, for example, an ink absorbent, low absorbent, or non-absorbent recording medium. Examples of the recording medium P include ink jet paper; PPC; fabric; sublimation transfer paper; surface-treated paper including aluminized paper, coated paper, art paper, and cast coated paper; and plastic films, such as polycarbonate films, PET films, and vinyl chloride sheets, provided with a ink-absorbing layer.

1.12. Advantages/Effects

In high-speed printing using an aqueous ink-jet ink composition containing water and a 1,2-alkanediol, since the 1,2-alkanediol is contained, cockling occurs to cause head scratching, the mass of ink droplets cannot be reduced, and it has been difficult to obtain a high-quality image in some cases. However, in this embodiment, since the ink-jet ink composition contains the specific 1,3-dioxolane compound, head scratching can be suppressed by preventing cockling and the mass of ink droplets can be reduced. Therefore, a high-quality image can be stably printed at high speed.

2. Examples

The present disclosure is further described below in detail with reference to examples and comparative examples. The present disclosure is not limited to the examples.

2.1. Preparation of Ink Compositions

Components were put into a container so as to give compositions in Tables 1 and 2 and were mixed and stirred for two hours using a magnetic stirrer, followed by a dispersion treatment in a bead mill filled with zirconia beads with a diameter of 0.3 mm, whereby the components were sufficiently mixed. After stirring for one hour, the mixtures were filtered using a PTFE membrane filter with a pore size of 5 μm, whereby inks were obtained. Values in Tables 1 and 2 were expressed in mass percent unless otherwise specified. Ultra-pure water was added such that the total mass of each ink was 100% by mass. The value of pigment or resin in Tables 1 and 2 was expressed in mass percent in terms of solid matter which was an effective component.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| 1,2-Hexanediol | | 0 | 0 | 0 | 0 | 6 | 12 | 12 | 6 | 2 |
| 1,2-Octanediol | | 2 | 2 | 2 | 2 | 2 | 2 | 2 | 2 | 0 |
| Glycereth-26 | | 6 | 12 | 12 | 6 | 0 | 0 | 0 | 0 | 6 |
| Solketal | | 6 | 12 | 6 | 12 | 6 | 12 | 6 | 12 | 6 |
| Polysiloxane surfactant | | 0.5 | 0.5 | 0.5 | 0.5 | 0.5 | 0.5 | 0.5 | 0.5 | 0.5 |
| Triethanolamine | | 0.5 | 0.5 | 0.5 | 0.5 | 0.5 | 0.5 | 0.5 | 0.5 | 0.5 |
| Colorant pigment dispersant | Oxyethyl resin | 1.0 | 1.0 | 1.0 | 1.0 | 1.0 | 1.0 | 1.0 | 1.0 | 1.0 |
| | Fluorene resin | 1.0 | 1.0 | 1.0 | 1.0 | 1.0 | 1.0 | 1.0 | 1.0 | 1.0 |
| | Pigment | 5.0 | 5.0 | 5.0 | 5.0 | 5.0 | 5.0 | 5.0 | 5.0 | 5.0 |
| | 2,5-Dimethyl-2,5-hexanediol | 3.0 | 3.0 | 3.0 | 3.0 | 3.0 | 3.0 | 3.0 | 3.0 | 3.0 |
| | Ultra-pure water | 40.0 | 40.0 | 40.0 | 40.0 | 40.0 | 40.0 | 40.0 | 40.0 | 40.0 |
| Ultra-pure water | | Balance | Balance | Balance | Balance | Balance | Balance | Balance | Balance | Balance |
| Evaluation of dot diameter | | A | A | B | A | A | A | B | A | A |
| Evaluation of head scratching | | A | A | A | A | B | B | B | B | A |
| Evaluation of discharge properties (Cap left) | | A | A | A | A | B | B | B | B | A |
| Evaluation of curl | | A | A | A | A | C | C | C | C | A |
| Aggregation spots | | A | A | A | A | A | A | A | A | C |

TABLE 2

| | Example 10 | Example 11 | Example 12 | Comparative Example 1 | Comparative Example 2 | Comparative Example 3 | Comparative Example 4 | Comparative Example 5 | Comparative Example 6 |
|---|---|---|---|---|---|---|---|---|---|
| 1,2-Hexanediol | 2 | 2 | 2 | 0 | 0 | 6 | 12 | 2 | 2 |
| 1,2-Octanediol | 0 | 0 | 0 | 2 | 2 | 2 | 2 | 0 | 0 |
| Glycereth-26 | 12 | 12 | 6 | 6 | 12 | 0 | 0 | 6 | 12 |
| Solketal | 12 | 6 | 12 | 0 | 0 | 0 | 0 | 0 | 0 |
| Polysiloxane surfactant | 0.5 | 0.5 | 0.5 | 0.5 | 0.5 | 0.5 | 0.5 | 0.5 | 0.5 |
| Triethanolamine | 0.5 | 0.5 | 0.5 | 0.5 | 0.5 | 0.5 | 0.5 | 0.5 | 0.5 |

TABLE 2-continued

|  |  | Example 10 | Example 11 | Example 12 | Comparative Example 1 | Comparative Example 2 | Comparative Example 3 | Comparative Example 4 | Comparative Example 5 | Comparative Example 6 |
|---|---|---|---|---|---|---|---|---|---|---|
| Colorant | Oxyethyl resin | 1.0 | 1.0 | 1.0 | 1.0 | 1.0 | 1.0 | 1.0 | 1.0 | 1.0 |
| pigment | Fluorene resin | 1.0 | 1.0 | 1.0 | 1.0 | 1.0 | 1.0 | 1.0 | 1.0 | 1.0 |
| dispersant | Pigment | 5.0 | 5.0 | 5.0 | 5.0 | 5.0 | 5.0 | 5.0 | 5.0 | 5.0 |
|  | 2,5-Dimethyl-2,5-hexanediol | 3.0 | 3.0 | 3.0 | 3.0 | 3.0 | 3.0 | 3.0 | 3.0 | 3.0 |
|  | Ultra-pure water | 40.0 | 40.0 | 40.0 | 40.0 | 40.0 | 40.0 | 40.0 | 40.0 | 40.0 |
| Ultra-pure water |  | Balance | Balance | Balance | Balance | Balance | Balance | Balance | Balance | Balance |
| Evaluation of dot diameter |  | A | B | A | C | C | C | C | C | C |
| Evaluation of head scratching |  | A | A | A | B | B | C | C | B | B |
| Evaluation of discharge properties (Cap left) |  | A | A | A | A | A | B | B | A | A |
| Evaluation of curl |  | A | A | A | A | A | C | C | A | A |
| Aggregation spots |  | C | C | C | A | A | A | A | C | C |

Among components shown in Tables 1 and 2, details of components described under a name other than a compound name are as described below.

Pigments: Black (C. I. Pigment Black 7)

Cyan (C. I. Pigment Blue 15:3)

Magenta (C. I. Pigment Red 122)

Yellow (C. I. Pigment Yellow 74)

Solketal®: 2,2-Dimethyl-1,3-dioxolane-4-methanol, which is a water-soluble 1,3-dioxolane compound represented by Formula (1).

Polysiloxane surfactant: SAG503A, available from Nissin Chemical Industry Co., Ltd.

Oxyethyl resin: Resin which contains a monomer, specified by CAS No. 72009-86-0, having an oxyethyl acrylate structure at a monomer composition ratio of 75% by mass and which has a number-average molecular weight of 6,900.

Fluorene resin: Resin which contains a monomer, specified by CAS No. 117344-32-8, having a fluorene skeleton at a monomer composition ratio of 50% by mass and which has a number-average molecular weight of 3,300.

2.2. Preparation of Prints

Y, M, C, and K inks obtained as described above were loaded into ink cartridges for an ink jet printer, X-G920, available from Seiko Epson Corporation in the form of an ink set such that recording could be performed at 720 dpi in a main scanning direction and 360 dpi in a sub-scanning direction. Next, the voltage of the printer was adjusted such that the dot size upon landing was about 7 ng, followed by recording a 720×720 dpi solid image (a top and bottom margin of 15 mm and a right and left margin of 10 mm) on a recording medium, with one drive being 720×360 dpi. Recording was performed in both directions and a single direction in a normal temperature, normal humidity environment in such a manner that the temperature of the drying unit 50 in FIG. 2 was set to 40° C. The amount of applied ink was about 3.6 mg/inch$^2$. The recording medium used was long-grain printing paper with a basis weight of 73.3 g/m$^2$ (ultra-thin paper), that is, "OKT+" available from Oji Paper Co., Ltd.

Incidentally, only in "2.3.1. Evaluation of Dot Diameter" below, recording articles were similarly obtained except that the voltage of the printer was adjusted such that the dot size upon landing was about 3 ng, followed by recording a 720×720 dpi image with a duty of 3% (a top and bottom margin of 15 mm and a right and left margin of 10 mm) on a recording medium, with one drive being 720×360 dpi.

2.3. Evaluation Tests 2.3.1. Evaluation of Dot Diameter

Ten single dots were selected with a metallurgical microscope (reflection microscope) and the diameter of the dots was measured as an impact diameter. The average of obtained impact diameters was determined and was evaluated in accordance with standards below.

Evaluation Standards

A: The diameter of 3 ng dots on OKT+ is less than 35 μm.

B: The diameter of 3 ng dots on OKT+ is 35 μm to less than 45 μm.

C: The diameter of 3 ng dots on OKT+ is 45 μm or more.

2.3.2. Evaluation of Head Scratching

For images obtained in Item 2.2., the degree of a defect in a print that was caused by scratching a printed surface by an ink jet head because a central portion of the printed surface was swollen was observed. The images were evaluated in accordance with standards below.

Evaluation Standards

A: A print is free from scratches caused by the ink jet head.

B: Only a central portion of a print has a scratch caused by the ink jet head.

C: A portion other than a central portion of a print has a scratch caused by the ink jet head.

2.3.3. Evaluation of Discharge Properties After Leaving Head Cap

The above ink jet printer was cleaned continuously three times in a 35° C., 15% RH environment. Thereafter, ruled lines were printed continuously for eight hours and the ink jet printer was left for three days with a head capped. Immediately after the ink jet printer was reset after leaving by a method in which no ink was consumed, a nozzle check pattern was printed and the discharge rate necessary for normal discharge was evaluated in accordance with standards below.

Evaluation Standards

A: In the printing of the nozzle check pattern, normal discharge was performed within three times.

B: In the printing of the nozzle check pattern, normal discharge was performed within four times to nine times.

C: In the printing of the nozzle check pattern, normal discharge was performed within ten times to 15 times.

2.3.4. Evaluation of Curl

Prints obtained in Item 2.2. were naturally dried for 24 hours in such a manner that the prints were left on a flat desk in a 25° C., 40% RH environment in such a state that a printed surface of each print was directed upward. Thereafter, the distances between the desk and four corners of each warped print were measured and were averaged, followed by evaluation in accordance with standards below.

Evaluation Standards
A: A height of less than 10 mm.
B: A height of 10 mm to less than 20 mm.
C: A height of 20 mm or more.

2.3.5. Evaluation of Aggregation Spots

Images obtained in Item 2.2. were evaluated in accordance with standards below.

Evaluation Standards
A: No aggregation spots present in bidirectional printing.
B: Aggregation spots present in bidirectional printing and no aggregation spots present in unidirectional printing.
C: Aggregation spots present not only in bidirectional printing but also in unidirectional printing.

2.4. Evaluation Results

In comparative examples in which no Solketal was contained, the diameter of dots on a recording medium after landing was large and no high-quality image was obtained in high-speed printing. However, in every example, the diameter of dots was small and a high-quality image was obtained.

When ink contains 6% by mass or more of 1,2-hexanediol or Glycereth-26, the ink is unlikely to be dried. Therefore, a coffee-stain phenomenon is unlikely to occur at the edges of dots, the wet spreading of the ink is not suppressed, and the diameter of the dots is large. On the other hand, the vapor pressure of Solketal is high, 0.2 mmHg, and the surface tension of an aqueous solution containing 6% by mass or more of Solketal is high, 50 mN/m or more; hence, ink itself is likely to be dried. Therefore, the coffee-stain phenomenon occurs clearly at the edges of dots; hence, the wet spreading of ink is suppressed and the diameter of the dots is small. Even though ink contained a water-insoluble 1,2-alkanediol, enhancing drying properties using Solketal enabled a high-quality image with a small dot diameter to be obtained as described above. When ink further contained Glycereth-26, the water-insoluble 1,2-alkanediol is dissolved or emulsified with Glycereth-26 and drying properties were enhanced by Solketal; hence, a higher-quality image with a small dot diameter was obtained.

In examples in which Solketal, which is a water-soluble alcohol with a vapor pressure of 0.2 mmHg or more, was contained, head scratching was good. This is not clear but is probably because Solketal, which is poor in solubility to the water-insoluble 1,2-alkanediol, facilitates the surface drying of a print.

Herein, in Examples 5 to 8, in which 6% by mass or more of 1,2-hexanediol, which is more water-soluble than 1,2-octanediol, was contained, head scratching was observed at a central portion. In these examples, Solketal was contained and therefore head scratching was less than in Comparative Examples 3 and 4. Hydroxy groups are unevenly present in 1,2-hexanediol and 1,2-hexanediol breaks hydrogen bonds in cellulose in paper. Therefore, it is conceivable that cellulose fibers on a printed surface are likely to be disentangled and this portion incorporates water in a short time to expand. In Examples 5 to 8 and Comparative Examples 3 and 4, curling that is a phenomenon in which, after a printed surface is expanded with water, the printed surface is contracted by drying was observed. This is probably because hydroxy groups in 1,2-hexanediol inhibited original uniform hydrogen bonds during drying.

Examples 5 to 8 and Comparative Examples 3 and 4 resulted in that the evaluation of discharge properties after leaving a head cap was poorer than that in other examples. This is probably because in these examples, since Glycereth-26, which serves as a humectant, was not contained, air in a 35° C., 15% RH environment in a cap absorbed moisture from an ink composition in a nozzle and discharge properties were reduced.

Examples 9 to 12 and Comparative Examples 5 and 6 resulted in that the evaluation of aggregation spots was poorer that that in other examples. This is probably because in Examples 9 to 12 and Comparative Examples 5 and 6, since 1,2-hexanediol only was contained as a 1,2-alkanediol and a lipophilic polar solvent excellent in wettability to a surface of printing paper was not contained, a water-repellent effect occurred at a solid-liquid interface. This shows that 1,2-octanediol is preferably contained as a 1,2-alkanediol in order to suppress the occurrence of aggregation spots and in order to obtain a higher-quality image.

The present disclosure is not limited to the above-mentioned embodiments and various modifications can be made. The present disclosure includes, for example, substantially the same configurations as configurations described in the embodiments, that is, configurations identical in function, method, and result or configurations identical in object and effect. The present disclosure includes configurations obtained by replacing nonessential portions of configurations described in the embodiments. The present disclosure includes configurations capable of providing the same advantageous effects as those of configurations described in the embodiments or capable of achieving the same object. Furthermore, the present disclosure includes configurations obtained by adding a known technique to configurations described in the embodiments.

What is claimed is:

1. An ink-jet ink composition comprising:
   a colorant;
   water;
   a 1,2-alkanediol; and
   a water-soluble 1,3-dioxolane compound represented by the following formula:

(1)

where $R^1$ and $R^2$ are independently selected from linear or branched alkyl groups containing one to four carbon atoms and $R^3$ is a hydrogen atom or at least one selected from the group consisting of an ethylene oxide adduct, a propylene oxide adduct, and a butylene oxide adduct and is terminated with a hydrogen atom.

2. The ink-jet ink composition according to claim 1, wherein the 1,2-alkanediol includes a 1,2-alkanediol containing seven or more carbon atoms.

3. The ink-jet ink composition according to claim 1, wherein the water-soluble 1,3-dioxolane compound represented by Formula (1) is 2,2-dimethyl-1,3-dioxolane-4-methanol or 2-isobutyl-2-methyl-1,3-dioxolane-4-methanol.

4. The ink-jet ink composition according to claim 1, further containing at least one selected from a water-soluble polyoxyalkylene glyceryl ether and water-soluble polyoxyalkylene trimethylolpropane.

5. The ink-jet ink composition according to claim 4, wherein the water-soluble polyoxyalkylene glyceryl ether and the water-soluble polyoxyalkylene trimethylolpropane are triols including at least one selected from the group consisting of an ethylene oxide adduct, a propylene oxide adduct, and a butylene oxide adduct.

6. The ink-jet ink composition according to claim 4, wherein the water-soluble polyoxyalkylene glyceryl ether is one selected from the INCI name PPG-24-Glycereth-24 and the INCI name Glycereth-26 and the water-soluble polyoxyalkylene trimethylolpropane is the INCI name PPG-25-PEG-25 Trimethylolpropane.

7. The ink-jet ink composition according to claim 4, wherein at least one selected from the group consisting of the water-soluble polyoxyalkylene glyceryl ether, the water-soluble polyoxyalkylene trimethylolpropane, and the water-soluble 1,3-dioxolane compound represented by Formula (1) is derived from a biomass source.

8. The ink-jet ink composition according to claim 4, wherein the ratio of the mass percentage of at least one selected from the water-soluble polyoxyalkylene glyceryl ether and the water-soluble polyoxyalkylene trimethylolpropane to the mass percentage of the 1,2-alkanediol is 3:1 to 6:1.

9. The ink-jet ink composition according to claim 1, wherein the ratio of the mass percentage of the water-soluble 1,3-dioxolane compound represented by Formula (1) to the mass percentage of the 1,2-alkanediol is 3:1 to 6:1.

10. The ink-jet ink composition according to claim 1, wherein the 1,2-alkanediol is 1,2-octanediol.

11. The ink-jet ink composition according to claim 1, further containing a polysiloxane surfactant represented by the following formula as a surfactant:

where R represents a hydrogen atom or a methyl group, a represents an integer of 2 to 18, m represents an integer of 0 to 70, and n represents an integer of 1 to 8.

* * * * *